United States Patent
Bergkvist et al.

(10) Patent No.: US 10,652,352 B2
(45) Date of Patent: May 12, 2020

(54) SERVER, CLIENT DEVICE AND METHODS THEREIN FOR HANDLING

(71) Applicant: Telefonaktiebolaget LM Ericsson (publ), Stockholm (SE)

(72) Inventors: Adam Bergkvist, Luleå (SE); Stefan Håkansson, Luleå (SE); Christer Holmberg, Kirkkonummi (FI); Daniel Lindström, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 66 days.

(21) Appl. No.: 15/037,263

(22) PCT Filed: Mar. 29, 2016

(86) PCT No.: PCT/SE2016/050259
§ 371 (c)(1),
(2) Date: May 17, 2016

(87) PCT Pub. No.: WO2017/018918
PCT Pub. Date: Feb. 2, 2017

(65) Prior Publication Data
US 2017/0289299 A1  Oct. 5, 2017

(51) Int. Cl.
*H04L 29/08* (2006.01)
*H04W 4/18* (2009.01)

(52) U.S. Cl.
CPC .......... *H04L 67/2847* (2013.01); *H04L 67/02* (2013.01); *H04L 67/22* (2013.01); *H04L 67/306* (2013.01); *H04W 4/18* (2013.01)

(58) Field of Classification Search
CPC ... H04L 67/2847; H04L 67/02; H04L 67/306; H04L 67/22
(Continued)

(56) References Cited

U.S. PATENT DOCUMENTS

| 8,954,524 B1* | 2/2015 | Hamon | G06Q 30/00 |
| | | | 705/14.53 |
| 2003/0060973 A1* | 3/2003 | Mathews | G01C 21/26 |
| | | | 701/410 |

(Continued)

FOREIGN PATENT DOCUMENTS

| CN | 102364461 A | 2/2012 | |
| EP | 1909066 A1 | 4/2008 | |
| WO | WO 2017018918 A1 * | 2/2017 | ............. H04L 29/08 |

OTHER PUBLICATIONS

YouTube, "The Undertaker vs The Great Khali", Feb. 26, 2016.*
(Continued)

*Primary Examiner* — Michael C Lai
(74) *Attorney, Agent, or Firm* — Murphy, Bilak & Homiller, PLLC (57) ABSTRACT

A server (600), a client device (602) and methods therein, for handling cached content resources. When the client device (602) sends a download request (6:3) in a downloading session, the server (600) identifies (6:4) at least one content resource deemed to be potentially needed later in the downloading session. The server (600) then sends a cache map to the client device (602) in a response to the download request. The cache map comprises a pre-fetch indication indicating that the identified at least one content resource should be pre-fetched by the client device (602) from a cache (604) containing the identified at least one content resource. Thereby, the client device is able to pre-fetch (6:8) the content resources before the performance of communication may become reduced so that communication with the cache (604) is difficult or even impossible, e.g. due to deteriorated radio conditions or congestion in the communication network.

22 Claims, 4 Drawing Sheets

(58) Field of Classification Search
USPC .......................................................... 709/218
See application file for complete search history.

(56) References Cited

U.S. PATENT DOCUMENTS

| | | | |
|---|---|---|---|
| 2003/0126232 A1* | 7/2003 | Mogul | G06F 17/30902 709/219 |
| 2005/0154781 A1 | 7/2005 | Carlson et al. | |
| 2006/0080032 A1* | 4/2006 | Cooper | G01C 21/32 701/532 |
| 2009/0094417 A1* | 4/2009 | Carlson | G06F 17/30902 711/137 |
| 2010/0302968 A1* | 12/2010 | Lu | H04W 24/08 370/252 |
| 2013/0097309 A1* | 4/2013 | Ma | H04L 29/08099 709/224 |
| 2014/0259147 A1* | 9/2014 | L'Heureux | H04L 63/02 726/14 |
| 2015/0215816 A1* | 7/2015 | Abou-Elkheir | H04N 21/25866 370/230 |
| 2015/0271288 A1* | 9/2015 | Burnette | H04L 67/2847 709/203 |
| 2015/0373079 A1* | 12/2015 | Seedorf | H04L 67/2847 709/218 |
| 2015/0379157 A1* | 12/2015 | Brown | G06F 17/30902 709/213 |
| 2016/0088118 A1* | 3/2016 | Sivasubramanian | H04L 67/2842 709/219 |
| 2016/0294942 A1* | 10/2016 | Tembey | H04L 67/1095 |

OTHER PUBLICATIONS

Mozilla, M. T. et al., "An Architecture for Secure Content Delegation using HTTP", Internet Engineering Task Force, Network Working Group, draft-thomson-http-scd-00, Mar. 21, 2016, 1-12.

Mozilla, M. T. et al., "Caching Secure Http Content Using Blind Caches", Internet Engineering Task Force, Network Working Group, draft-thomson-http-bc-00, Mar. 21, 2016, 1-7.

Reschke, J. et al., "'Out-Of-Band' Content Coding for HTTP", Internet Engineering Task Force, Networking Working Group, draft-reschke-http-oob-encoding-04, Mar. 17, 2016, 1-16.

Eriksson, G. et al., "Delivering content via Out-Of-Band Cache", Network Working Group, Ericsson, Oct. 6, 2015, 1-23.

Russell, Alex et al., "Service Workers Nightly", W3C Editor's Draft, Feb. 8, 2016, 1-69.

Unknown, Author, "Caching HTTPS—Shared Caching Without the Baggage", 1-45.

* cited by examiner

SERVER, CLIENT DEVICE AND METHODS THEREIN FOR HANDLING

TECHNICAL FIELD

The present disclosure relates generally to servers, client devices and methods therein as well as computer programs and computer program storage products, for handling cached content resources.

BACKGROUND

In recent years, the amount of traffic over communication networks such as the Internet and wireless networks has increased greatly due to extensive usage of various web services where users download content such as web pages from different web sites to their client devices. In this disclosure, the term "client device" is used to represent any communication entity that is capable of downloading content from a server or other content storage over a communication network. Further, the term "server" is used to represent any communication entity that is capable of delivering content such as web pages to client devices over a communication network which may include the Internet and/or a wireless network. The server mentioned throughout this disclosure could also be referred to as a content server, an origin server, a content server host or an origin server host.

Typically, web pages, or parts thereof, are downloaded in a browsing session where a user of a client device can browse a web site or the like and click on links to obtain various web resources. Other types of content such as movies, music and TV programs can also be downloaded from a server. The term "content resource" is used herein to represent any piece of content that can be downloaded by a client device in a downloading session such as a browsing session or a Hypertext Transfer Protocol, HTTP, session, to mention some illustrative but non-limiting examples. A content resource may thus, without limitation, be a web page or some part thereof, or some video or audio content which can be accessed from a server e.g. providing a web site. Further, the term "downloading session" refers to any communication session where content is downloaded by a client device. To protect the content from being intercepted it is also becoming increasingly common to employ encryption of the content, e.g. by using HTTPS (HTTP Secure).

In order to reduce the amount of traffic and/or the load on the server caused by such downloading, caching can be employed where content resources offered by a server are stored at a location which may be "closer" to the client devices in terms of the number of transport links and network nodes involved, thereby reducing the transport distance and also the time it takes to get a requested content resource. For example, frequently requested content resources may be cached in this manner so as to reduce the traffic in the network and/or the load on the server caused by such download requests and resulting communication between the client devices and the server, referred to as round-trips.

The location where content resources are cached in this manner is commonly referred to as a "cache" which term will be used herein. A cache is thus a storage for content resources. The term "origin server" is also commonly used to denote a server, or server host, where content is originally stored which content may be temporarily stored, i.e. cached, in a cache.

When content resources are downloaded from a server by accessing a web site or the like, a large number of round-trips between client device and server may be required when each content resource must be requested separately, only to be directed to the cache. This is required when HTTPS is employed while when HTTP is employed the requests are terminated in the cache. For HTTPS the concept of "Blind Caching", BC, also known as "Out-of-Band Caching", OOBC, has been introduced to allow efficient caching also when HTTPS is employed. Briefly described, BC or OOBC allows for fetching content resources directly from a cache even when the content resources are encrypted e.g. using HTTPS. The number of round-trips in a browsing session can be reduced by employing a so-called cache map with information about where a range of different content resources can be fetched from various caches. The cache map may also be referred to as a resource map. Throughout this disclosure, the terms "fetching" and "downloading" are used interchangeably.

In brief, the server, typically an origin server or similar, sends the cache map to the client device early in a downloading session, and each time a new content resource is to be fetched, such as when a user clicks on a link in a web page, the client device checks if that content resource is present on the cache map. A link of a web page may be associated with numerous individual content resources, sometimes hundreds of them, and when the user clicks on such a link the client device needs to fetch all these content resources. If any of the content resources are present on the cache map, the client device can fetch those content resources from a cache according to the cache map, instead of requesting them from the origin server only to be directed to the cache. For further description of the cache map, reference is made to "Delivering content via Out-Of-Band Cache":

https://github.com/EricssonResearch/blind-cache-draft/blob/master/draft-eriksson-oob-cache-latest.txt, retrieved on Feb. 8, 2016.

However, if the performance of communication in a downloading session becomes degraded, or if the server of a browsed web site or the like becomes heavily loaded by numerous download requests, it may happen that the user of the client device experiences increased latency in terms of waiting time before a requested content resource is fetched and can be presented, e.g. displayed or otherwise played-out, on the device. It may also happen that the cache is overloaded by many downloading operations and the above-described cache map may direct the client device to the overloaded cache causing further load on the cache.

In another example when the client device uses a wireless connection for the communication, the radio conditions of the connection may deteriorate, e.g. due to bad coverage or high interference caused by other communications, and/or there may be a lack of available radio resources needed for the communication due to high traffic load in the wireless network used, etc.

Any of the above circumstances may thus reduce the performance of the communication resulting in frustrating latency and degradation of the user's downloading experience e.g. when browsing a web page or the like.

SUMMARY

It is an object of embodiments described herein to address at least some of the problems and issues outlined above. It is possible to achieve this object and others by using a server, a client device and methods therein as defined in the attached independent claims.

According to one aspect, a method is performed in a server for handling cached content resources. In this method the server receives a download request from a client device in a downloading session, and identifies at least one content resource deemed to be potentially needed later in the downloading session. The server then sends a cache map to the client device in a response to the received download request. The cache map comprises a pre-fetch indication indicating that the identified at least one content resource should be pre-fetched by the client device from a cache containing the identified at least one content resource.

Thereby, it is possible to off-load the server by reducing the number of requests directed to the server. Furthermore, the client device is able to pre-fetch the content resource(s) before the performance of communication may become reduced so that communication with the cache is difficult or even impossible, e.g. due to deteriorated radio conditions or congestion in a communication network used in the downloading session.

According to another aspect, a computer program storage product comprises instructions which, when executed on a server, cause the server to carry out the above-described method.

According to another aspect, a computer program comprises instructions which, when executed on a server, cause the server to carry out the above-described method.

According to another aspect, a server is arranged to handle cached content resources. The server comprises a processor and a memory containing instructions executable by the processor, whereby the server is configured to receive a download request from a client device in a downloading session, and to identify at least one content resource deemed to be potentially needed later in the downloading session. The server is further configured to send a cache map to the client device in a response to the received download request, the cache map comprising a pre-fetch indication indicating that the identified at least one content resource should be pre-fetched by the client device from a cache containing the identified at least one content resource.

According to another aspect, a method is performed by a client device for handling cached content resources. In this method the client device receives a cache map from a server during a downloading session, the cache map comprising a pre-fetch indication indicating that at least one content resource should be pre-fetched from a cache. The client device then pre-fetches the at least one content resource from the cache according to the pre-fetch indication, to enable subsequent usage of the at least one content resource in the client device once the at least one content resource is requested or needed in the client device.

Thereby, the pre-fetched content resources will be available in the client device for immediate play-out or other usage in case they are requested later, e.g. by the user or by some application running in the client device.

According to another aspect, a computer program storage product comprises instructions which, when executed on a client device, cause the client device to carry out the above-described method.

According to another aspect, a computer program comprises instructions which, when executed on a client device, cause the client device to carry out the above-described method.

According to another aspect, a client device is arranged to handle cached content resources. The client device comprises a processor and a memory containing instructions executable by the processor, whereby the client device is configured to receive a cache map from a server during a downloading session, the cache map comprising a pre-fetch indication indicating that at least one content resource should be pre-fetched from a cache. The client device is also configured to pre-fetch the at least one content resource from the cache according to the pre-fetch indication, to enable subsequent usage of the at least one content resource in the client device once the at least one content resource is requested or needed in the client device.

According to another aspect, a server is arranged to handle cached content resources. The server comprises a receiving unit configured to receive a download request from a client device in a downloading session. The server also comprises an identifying unit configured to identify at least one content resource deemed to be potentially needed later in the downloading session. The server further comprises a sending unit configured to send a cache map to the client device in a response to the received download request, the cache map comprising a pre-fetch indication indicating that the identified at least one content resource should be pre-fetched by the client device from a cache containing the identified at least one content resource.

According to another aspect, a client device is arranged to handle cached content resources. The client device comprises a receiving unit configured to receive a cache map from a server during a downloading session, the cache map comprising a pre-fetch indication indicating that at least one content resource should be pre-fetched from a cache. The client device also comprises a fetching unit configured to pre-fetch the at least one content resource from the cache according to the pre-fetch indication, to enable subsequent usage of the at least one content resource in the client device once the at least one content resource is requested or needed in the client device.

The above servers, client devices and methods may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable a client device to pre-fetch certain content resources in a downloading session with a server, which content resources are deemed to be potentially needed at some point after they have been pre-fetched. This can be accomplished by setting a pre-fetch indication in a cache map that is sent to the client device, where the pre-fetch indication indicates that the content resources should be pre-fetched from a cache where the content resources are stored. The cache map is sent to the client in response to a download request made by the client device in a downloading session, e.g. the very first download request in the downloading session. Thereby, the content resources will be available in the client device for immediate display or play-out in case they are requested later, e.g. by the user or by some application running in the client device.

It was mentioned above that the number of round-trips between the client device and the server can be greatly reduced by employing a cache map since it is not necessary then for the client device to request each and every needed content resource from the server, thus avoiding unwanted latency and excessive communication with the server. If the cache is located closer to the client device than the server in terms of the amount of intermediate links, procedures and nodes, each fetch from that cache can be made quicker than downloading from the server. In this solution, the content resources may be pre-fetched from the cache depending on the pre-fetch indication in the cache map and the latency can thereby be further reduced once the pre-fetched content resources are needed for use.

Another advantage of this solution is that the client device is able to pre-fetch content resources before the performance of communication may become reduced, e.g. due to deteriorated radio conditions if the client device is a wireless device, or due to congestion in the communication network used, and so forth. Otherwise it may be difficult, if possible at all, to fetch the content resources later due to poor performance in the communication. Some examples of how the server may identify one or more content resources to be pre-fetched by the client device, will be described later below.

Yet another advantage of employing the pre-fetch indication of this solution is that the server will get an added possibility to control whether some content resources should be fetched immediately from the cache, or be fetched later in case the content resources are needed, either from the cache or from the server itself, e.g. depending on the current load on the server and/or the cache. Hence, the server can control the further load on the cache or the server caused by the fetching operation in a more or less dynamic manner by means of the cache map, basically by using one of the following three options.

Firstly, if a pre-fetch indicator is set for a particular content resource in the cache map, the client device will be triggered to pre-fetch that content resource immediately from the indicated cache. Secondly, if the pre-fetch indicator is not set for the content resource present in the cache map, the client device may fetch the resource at some later point from the indicated cache. Thirdly, if that content resource is not at all present in the cache map, the client device may request and fetch the resource at a later point from the server. In this way, the server is able to use the cache map to control how and when the client device will fetch the content resource, if at all.

Figure 1:
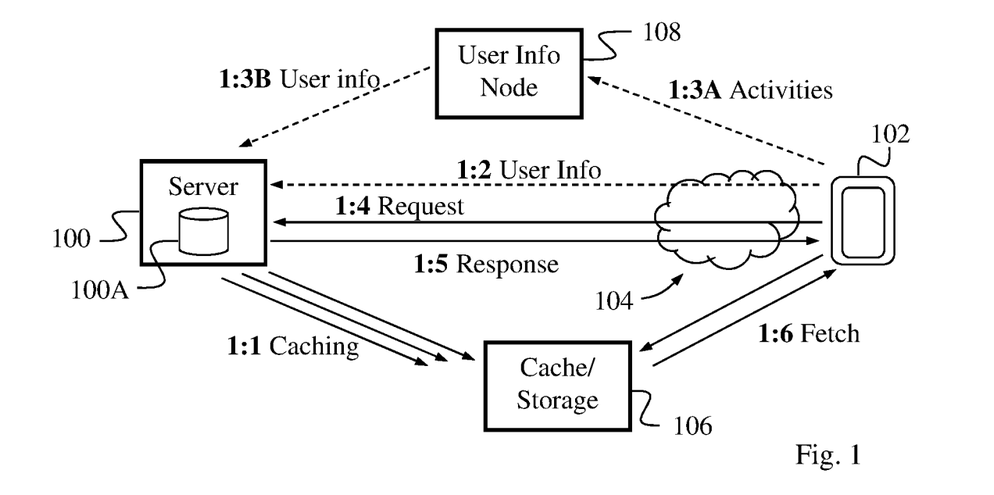
FIG. 1 is a communication scenario illustrating how a cache can be used for providing content resources, which may be employed when implementing embodiments described herein.

FIG. 1 illustrates a communication scenario where the solution may be employed as follows. In this scenario, a server 100 is operative to enable a client device 102 to download content resources over a communication network 104. In other words, the server 100 is operative to provide content resources to the client device 102. "Communication network" is a general term used here to represent any type of network(s) over which content resources can be transported, e.g. including a wireless or mobile network if the client device 102 is a wireless device capable of radio communication. The solution described herein is also applicable for a client device using a fixed or wired connection to the communication network 104. The schematically illustrated communication network 104 may also include the Internet. The server 100 may comprise a storage 100A holding all content resources provided by the server 100 so that any content resource can be downloaded, i.e. fetched, from the server 100 itself if not from a cache.

In some examples described herein it is assumed that the client device is operated by a user, although the embodiments herein are not limited thereto and some non-limiting examples of devices are outlined below. The client device 102 is in this example schematically illustrated as a mobile phone in the form of a smartphone in FIG. 1, but it may also be any of a laptop computer, a tablet computer, a wireless modem, and a sensor device. It may also be a more stationary device such as a telematics unit embedded in or attachable to a vehicle, such as a car, truck, bus, boat, train, airplane and flying drone. The client device 102 may also for example be embedded in or attachable to a domestic appliance, such as in white goods, door locks, surveillance and alarm equipment and autonomous vacuum cleaners and grass cutters.

The client device may also be embedded in or attachable to telematics units for robots and 3D printers used for industrial purposes or for domestic support functions. Other examples of where the client device may be incorporated or added to is in public service equipment, such as street lamps, surveillance cameras, and entrance admittance equipment for public transport. The client device described herein may in other words be, or be implemented in, any equipment which is able to utilize the connectivity to the communication network 104. Further examples of such client devices are equipment used in healthcare and in payment terminals, e.g. payment terminals for credit cards.

A first action 1:1 illustrates that the server 100 performs caching of various content resources by storing them in a cache 106, hence referred to as caching, for enabling faster downloads to client devices. For example, the server 100 may push content to the cache 106, or the server may alternatively send a list of content resources to the cache 1006 which in turn will fetch those resources from the server 100. It was described above how caching can provide more efficient downloading of content resources. It is assumed that the client device 102 is able to fetch content resources from the cache 106 more efficiently than fetching them from the server 100. This caching action may be performed once and for all, or at different occasions, e.g., whenever a content resource becomes available in the server 100 or whenever a content resource is requested by a client device.

An optional action 1:2 illustrates that the client device 102 may send certain user information to the server 100 at some point, which information can be used as a basis for configuring a cache map for the client device 102, which will be described in more detail later below. The user information may be related to various characteristics of the user of the device 102 such as age, gender, interests, profession, and so forth. The user information may further be related to previous downloads of content resources made by the client device 102, effectively defining a "downloading history" of the user. The user information is therefore deemed to be useful for predicting, i.e. identifying, which content resources might be potentially interested for the user to download.

Alternatively, the client device 102 may report its downloading activities to a specific node used for collecting and maintaining user information, here called a "user information node" 108 which may be implemented in a suitable node of the network 104 or in any node that can be accessed in the manner described herein. This reporting of downloading activities is illustrated by an action 1:3A. The User Information Node 108 may be used by the server 100 to obtain user information as a basis for configuring cache maps for client devices. Another action 1:3B illustrates that the server 100 obtains information about a current user of the client device 102 from the user information node 108. The above-described actions 1:1-1:3A,B may be performed at any time in preparation for the subsequent actions below.

The following actions in FIG. 1 illustrate how a download session may be executed for the client device 102 in the shown scenario. The download session may start e.g. when a user clicks on a link to a web page or other content, or when some application running in the device needs a content resource, which triggers the client device 102 to send a content request to the server 100. The next action 1:4 thus illustrates that the client device 102 accordingly sends a download request to the server 100, which may be the very first, or at least an "early", request for a content resource in the download session. As mentioned above, selecting a link to some content may trigger the client device to fetch a series of individual content resources associated to that link, each fetching operation normally requiring a download request from the client device.

In response to the download request of action 1:4, the server 100 sends a response that includes a cache map to the client device 102, illustrated by a following action 1:5. The response in this action may also contain a content resource requested in the download request. The sent cache map comprises a pre-fetch indication indicating that one or more content resources should be pre-fetched by the client device 102 from the cache 106. Examples of how the cache map may be configured by the server 100 will be described in more detail later below. A final action 1:6 illustrates that the client device 102 pre-fetches the one or more content resources from the cache 106, in accordance with the cache map and the pre-fetch indication therein.

In the communication of the above-described actions, the protocol HTTP may be used, e.g. according to any of the following 3 examples.

Example 1 the client device 102 sends a HTTP GET request for a content resource in action 1:4. In response thereto, the server 100 sends a 200 OK in action 1:5, adding content-encoding: out-of-band. The content of the 200 OK contains the cache map instead of the actual resource.

Example 2 the client device 102 sends a HTTP GET request for a content resource in action 1:4. In response thereto, the server 100 sends a 200 OK in action 1:5 with content-type: multipart/mixed. One part of the body is the requested content and the other is the cache map.

Example 3 the client device 102 sends a HTTP GET request for a content resource in action 1:4. In response thereto, the server 100 sends a 200 OK in action 1:5 with a link header and a body containing the requested resource. The link header in the 200 OK informs the client device 102 that there is a cache map available from a certain cache map address. The link header in the 200 OK may e.g. be Link: <https://a_server.com/path_to_resource_map>; rel="resource-map"

The client then sends a HTTP GET request to the cache map address and gets the cache map.

An example will now be described, with reference to the flow chart in FIG. 2, of how the solution may be employed in terms of actions which may be performed in a server, such as the above-described server 100, for handling cached content resources. Reference will sometimes also be made, without limiting the features described, to the example shown in FIG. 1. The procedure illustrated by FIG. 2 can thus be used to accomplish the functionality described above for the server 100 in communication with the client device 102.

A first action 200 illustrates that the server 100 receives a download request from the client device 102 in a downloading session. In a following action 202, the server 100 identifies at least one content resource deemed to be potentially needed later in the downloading session. Some examples of how this action may be performed will be described later below. A further action 204 illustrates that the server 100 may also identify a cache which contains the identified at least one content resource. Alternatively, if the identified at least one content resource has not yet been stored in any cache, the server 100 may store, i.e. cache, the identified content resource(s) in a suitable cache, indicated as an alternative "store in cache" in action 204.

In a final shown action 206, the server 100 sends a cache map to the client device in a response to the received download request, the cache map comprising a pre-fetch indication indicating that the identified at least one content resource should be pre-fetched by the client device 102 from a cache 106 containing the identified at least one content resource.

Various different non-limiting embodiments are possible to employ in the above-described procedure and some examples of embodiments will now be outlined. In one example embodiment, the at least one content resource may be identified in action 202 based on any of:

A) Events in one or more previous downloading sessions with the client device 102. This type of information may be referred to as downloading history of the client device 102 and its user. For example, the server 100 may store and keep information about downloads made by client devices, at least for a certain time, as a basis for making the identification described for action 202.

B) Information in a HyperText Transfer Protocol, HTTP, header of a previous download request received from the client device 102. Such information that could be included in the HTTP header may be related to position and/or planned route of the client device 102 when the request was made.

C) Information about the current user of the client device 102. In another example embodiment, the information about the current user may be obtained in a report message received from the client device 102, or from a user information node 108 to which the client device 102 has reported its previous download activities. It was described above for actions 1:2 and 1:3A,B how the server 100 might obtain such information about the current user.

Figure 3:
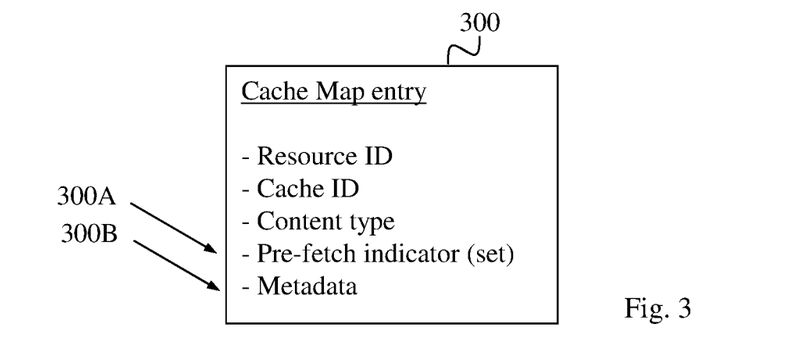
FIG. 3 is a flow chart illustrating a procedure in a client device, according to further possible embodiments.

It was mentioned above that the cache map may be configured in different ways to provide the pre-fetch indication described herein. Thus in another example embodiment, which is schematically illustrated in FIG. 3, an entry 300 in the cache map for each of the identified at least one content resource may comprise a pre-fetch indicator 300A which is set to provide the pre-fetch indication. For example, the pre-fetch indicator 300A may be set by a bit having a first value such as "1" and not set by the bit having a second value such as "0". Alternatively, the first value may be 0 and the second value may be 1. Another possibility is to include the pre-fetch indication as true or the like in the cache map entry only when the resource is to be pre-fetched, and not include any pre-fetch indication at all in the cache map entry when the resource is not to be pre-fetched.

If the pre-fetch indicator 300A is not set, e.g. having value 0 or not present at all in the cache map entry, it means that the content resource should not be pre-fetched. The server thus only sets the pre-fetch indicator 300A for the content resource(s) identified in action 202, while no pre-fetch indicator is set for all the other content resources in the cache map. The schematic example cache map entry 300 shown in FIG. 3 further comprises an identification of the content resource in question, denoted resource ID, an identification of the cache 106 where the content resource can be fetched, denoted cache ID, and also information about what type of content the resource is.

The cache map entry 300 further comprises metadata 300B which may include information about conditions or rules that may be used to control the client device's 102 pre-fetching operation. The metadata 300B may also include encryption information such as an encryption key, in case the content resource is encrypted and needs to be decrypted by the client device. In further example embodiments, the entry 300 in the cache map for each of the identified at least one content resource may thus comprise metadata 300B indicating at least one of time and position of the client device 102 for pre-fetching the respective content resource.

The metadata 300B may control the client device 102 to pre-fetch the content resource of this entry according to an indicated time, which could be a certain time interval during which it should be pre-fetched, or a latest (maximum) time before which it should be pre-fetched, or an earliest (minimum) time after which it should be pre-fetched. For example, the metadata 300B may indicate that the content resource should be pre-fetched during a time of day when the cache is usually not highly loaded. Alternatively or additionally, the metadata 300B may control the device 102 to pre-fetch the content resource only when the device is located within a certain area, or when being connected to a certain base station or access point serving a certain area, or only when a battery level is above a certain level, or only when the device is connected to a battery charger.

As mentioned above, the metadata 300B may further include information related to encryption of the content resources, useful for decrypting the pre-fetched content resource(s). An example of how some cache map entries may be configured in practice for three different content resources is presented below.

```
[
    {
        "resource-origin": "https://example-origin.com/image/dog.jpg ",
        "resource-mapped": " https://example-cache.com/abc/001",
        "content-type": "image/jpeg"
    },
    {
        "resource-origin": "https://example-origin.com/image/car.jpg",
        "resource-mapped": " https://example-cache.com/abc/002",
        "content-type": "image/jpeg",
        "encryption": {
            "key": "some-secret-key",
            "salt": "some salt"
        },
        "prefetch": true
    },
    {
        "resource-origin": "https://example-origin.com/image/cat.jpg",
        "resource-mapped": "https://example-cache.com/abc/003",
        "content-type": "image/jpeg",
        "prefetch": true
    }
]
```

The above example thus shows three cache map entries for three respective content resources including images of a dog, a car and a cat, respectively. The notation—"prefetch": true—in the entries for the car image and the cat image is a pre-fetch indicator indicating that these images should be pre-fetched from the identified cache.

In another example embodiment, the server 100 includes the pre-fetch indication in the cache map upon detecting that a wireless connection used by the client device 102 will get degraded. In this embodiment, the client device is thus a wireless device using wireless communication in the downloading session. An advantage of this embodiment is that the at least one content resource will be pre-fetched before the degradation of the connection occurs which would make the downloading difficult or even impossible to make once the content resource(s) is needed. Such a forthcoming degradation of the device's wireless connection may be detected in different ways as follows.

In further example embodiments, the above detecting of forthcoming degradation of the wireless connection may comprise at least one of:
  D) Detecting that the client device 102 is moving into an area of deficient radio coverage. For example, this detection may be made based on knowledge about the network's coverage and on the movement of the device which may be obtained by means of a positioning mechanism in the network 104 and/or in the device 102 according to known techniques which are not necessary to described in any detail herein.
  E) Detecting that the wireless connection will be lost or interfered due to intense radio traffic. For example, if the radio traffic is increasing, it can be deduced that the device's connection will be degraded, e.g. due to increased interference to the radio communication from other radio transmissions.

In another example embodiment, the server 100 may include the pre-fetch indication in the cache map when further detecting that a signal quality of the wireless connection will be above a predefined level before getting degraded. The predefined level of signal quality may have been selected so that the pre-fetch operation can be performed successfully, e.g. without losing the connection and/or without too much harmful interference.

In another example embodiment, the server 100 may include the pre-fetch indication in the cache map upon detecting that the communication network 104 used for the downloading session will be congested. In some examples, a forthcoming congestion in the network may be predicted on the basis of time of day when the network is normally congested, or by detecting an increase of ongoing wireless communications in the area where the device is located, and so forth.

Another example will now be described, with reference to the flow chart in FIG. 4, of how the solution may be employed in terms of actions which may be performed in a client device, such as the above-described client device 102, for handling cached content resources. Reference will sometimes also be made, without limiting the features described, to the example shown in FIG. 1. The procedure illustrated by FIG. 4 can thus be used to accomplish the functionality described above for the client device 102 in communication with the server 100.

Figure 2:
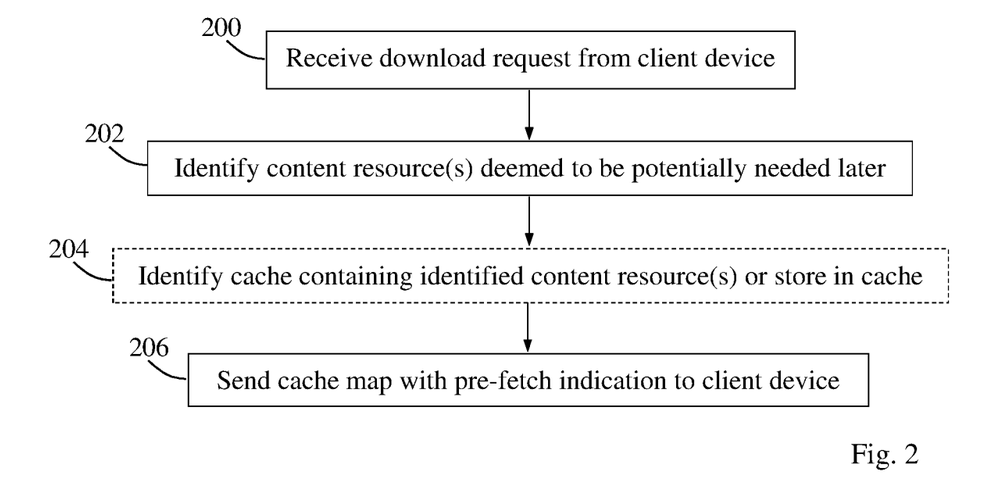
FIG. 2 is a flow chart illustrating a procedure in a server, according to some possible embodiments.

A first optional action 400 illustrates that the client device 102 may send a download request to the server 100 in a downloading session, thus corresponding to action 200 in FIG. 2. In a next action 402, the client device 102 receives a cache map from the server 100 during the downloading session, the cache map comprising a pre-fetch indication indicating that at least one content resource should be pre-fetched from a cache, such as cache 106 in FIG. 1. This action corresponds to action 206 in FIG. 2. The client device 102 is thereby triggered to pre-fetch the at least one content resource from the cache 106 according to the pre-fetch indication, in another action 404. By doing this, the client device 102 is enabled to use the at least one content resource e.g. by performing subsequent presentation of it on the client device 102, once a user input requesting the at least one content resource is received, if at all. A final optional action 406 illustrates that the client device 102 may, at some point, present or otherwise use the pre-fetched content resource(s), e.g. when requested by a user or needed by an application or the like in the device.

Figure 5A:
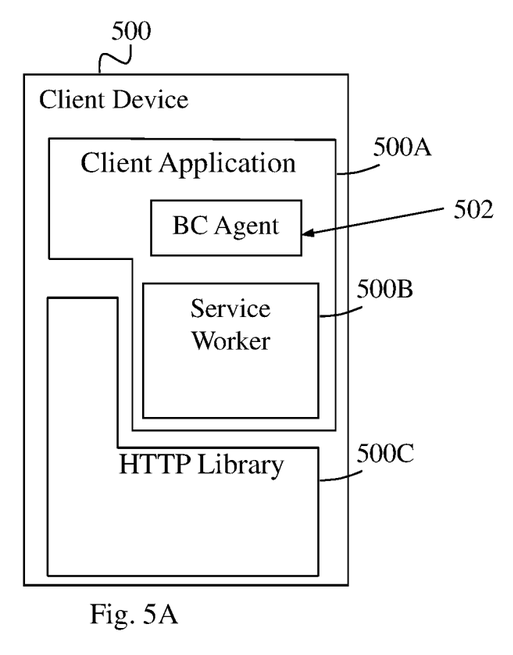
FIG. 5 is a signaling diagram illustrating a more detailed example of a procedure when the solution is used, according to further possible embodiments.
Figure 5B:
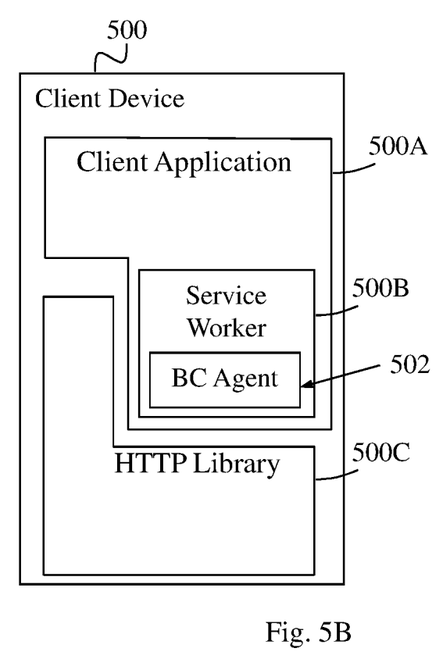
Figure 5C:
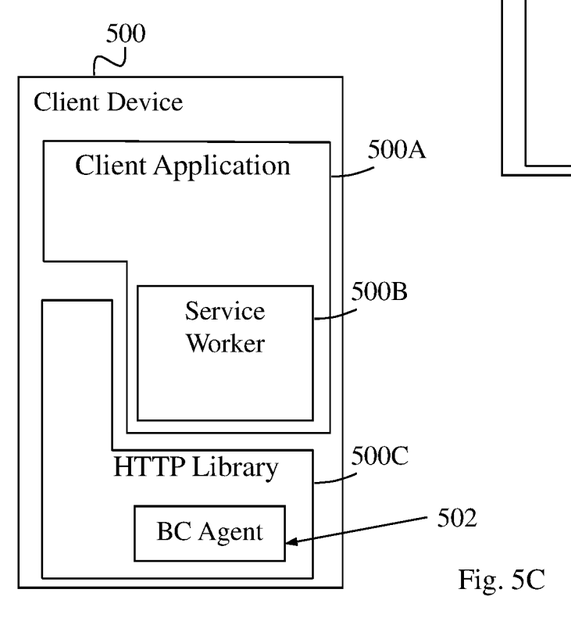

Various different non-limiting embodiments are possible to employ in the above-described procedure in the client device and some examples of embodiments will now be outlined. In some example embodiments, the pre-fetching of the at least one content resource from the cache may be executed by means of a caching agent in the client device. FIG. 5A-5C illustrate some examples of how such a caching agent may be implemented in the client device 500. The caching agent 502 is denoted "BC agent" in these examples where BC stands for Blind Cache. The caching agent 502 may be implemented in either of:
- a client application 500A running in the client device, as shown in FIG. 5A,
- a script of a ServiceWorker 500B, as shown in FIG. 5B, and
- a HyperText Transfer Protocol, HTTP, Library 500C, as shown in FIG. 5C.

In another example embodiment, an entry in the received cache map for each of the at least one content resource comprises a pre-fetch indicator which is set to provide said indication. This embodiment is illustrated in FIG. 3 and has been described above.

In another example embodiment, the client device 102 may pre-fetch the at least one content resource from the cache 106 according to metadata 300B comprised in the entry 300, the metadata indicating at least one of time and position of the client device 102 for pre-fetching the respective content resource. The metadata of this embodiment corresponds to the metadata 300B described above for FIG. 3.

In another example embodiment, the client device 102 may receive the cache map in response to a download request sent to the server 100 in the downloading session. The download request of this embodiment corresponds to the above-described actions 1:4 and 200 and it may be the first, or at least an early, download request in the downloading session.

Figure 6:
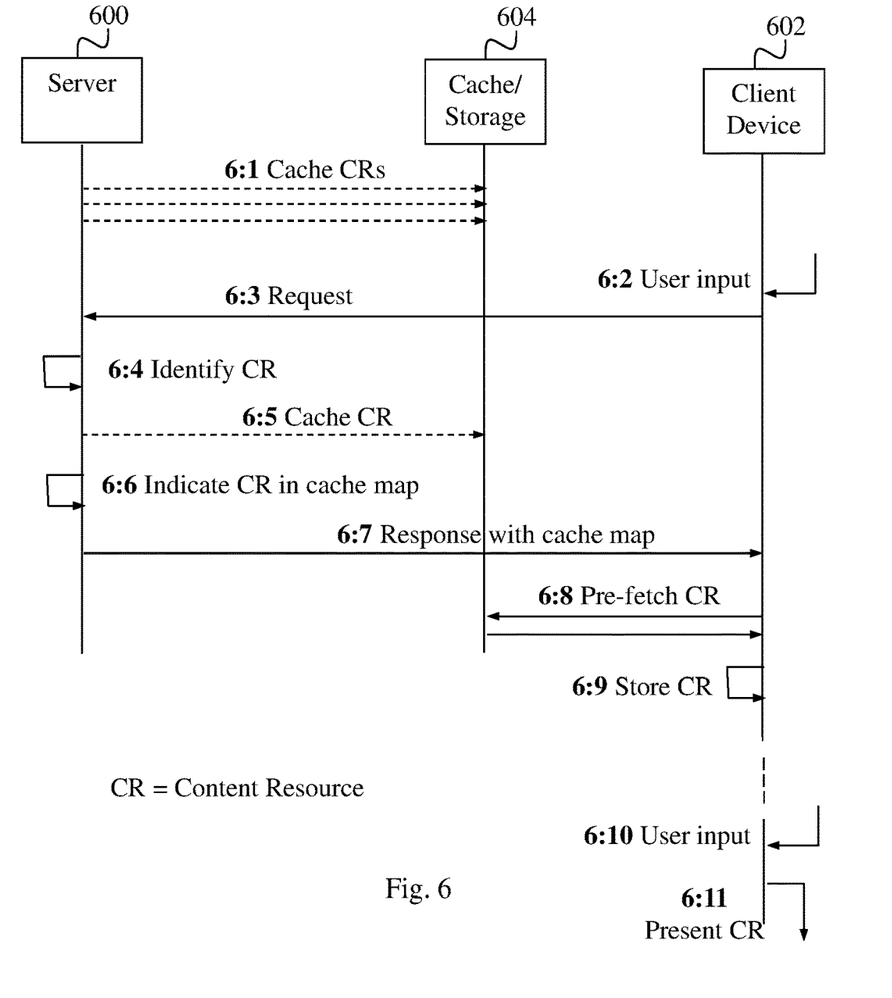
FIG. 6 is a schematic illustration of an entry in a cache map, according to further possible embodiments.

Another illustrative but non-limiting example of how a server and a client device may operate in more detail will now be described with reference to the signalling diagram in FIG. 6. In this figure, a server 600, a client device 602 and a cache 604 are shown. A first action 6:1 illustrates that the server 600 caches various content resources in the cache 604, which corresponds to the above-described action 1:1.

In a next action 6:2 the client device 602 receives some input from a user which triggers a downloading session which starts with the client device 602 sending a download request to the server 600, in an action 6:3, which corresponds to the above-described actions 1:4, 200 and 400. The input in action 6:2 may alternatively come from some application running in the device 602.

In a next action 6:4, the server 600 identifies a content resource, denoted CR, which is deemed to be potentially needed later in the downloading session. This action corresponds to the above-described action 202. Here, it should be understood that the server 600 may identify any number of content resources of potential interest to the user and the solution is not limited in this respect. Several examples of how this action may be performed have been described above. Another action 6:5 illustrates that the server 600 may cache the identified content resource in the cache 604, in case the content resource is not already stored therein. After action 6:4, the server 600 may thus try to identify a cache where the identified content resource is already stored, as described above for action 204, and if no such cache is found action 6:5 is performed.

In a next action 6:6, the server 600 creates a cache map and indicates therein that the identified content resource should be pre-fetched by the client device 602, e.g. by setting a pre-fetch indicator for the content resource in the cache map, which has also been described above. The server 600 then sends a response with the cache map to the client device 602, in an action 6:7, which corresponds to the above-described actions 1:5, 206 and 402. Having received the cache map, the client device 602 accordingly pre-fetches the indicated content resource from the cache, in another action 6:8, and stores the pre-fetched content resource for later use, in another action 6:9.

At some point later, the client device 602 receives some input from a user, in an action 6:10, which indicates that the pre-fetched content resource is needed to be presented, e.g. played out, on the client device 602. As the content resource has already been fetched and stored in advance, it can be presented immediately on the client device 602, as shown in a final action 6:11. It is an advantage that the pre-fetched content resource can be presented without delay once it is needed, and it is not necessary to fetch it after receiving the user input in action 6:10 which may be difficult or even impossible if the network connection used by the client device 602 has been degraded or lost altogether at that point.

A non-limiting example of how a server and a client device may be structured to bring about the above-described solution and embodiments thereof, will now be described with reference to the block diagram in FIG. 7. In this figure, the server 700 and the client device 702 may be configured to operate according to any of the examples and embodiments of employing the solution as described above, where appropriate, and as follows. Each of the server 700 and the client device 702 is shown to comprise a respective processor 700P, 702P, a respective memory 700M, 702M and a communication circuit denoted "C" with suitable equipment for transmitting and receiving information and messages in the manner described herein.

The communication circuit C in each of the server 700 and the client device 702 thus comprises equipment configured for communication using a suitable protocol depending on the implementation. It was mentioned above that HTTP may be used in the communication. The solution is however not limited to any specific types of messages or protocols. Examples of how the communication may be performed were described above with reference to FIGS. 1 and 6.

Figure 4:
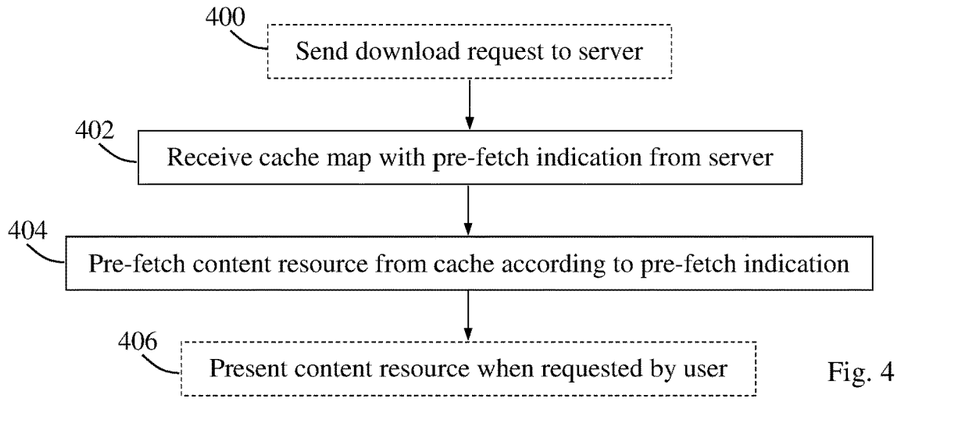
FIG. 4 is a block diagram illustrating examples of how a client device may be configured for enabling embodiments described herein.

The actions of FIGS. 2 and 4 may be performed by means of functional units in the respective processors 700P, 702P in the server 700 and the client device 702. For example, the server 700 may comprise means configured or arranged to perform at least some of the actions of the flow chart in FIG. 2 in the manner described above. Further, the client device 702 may comprise means configured or arranged to perform at least some of the actions of the flow chart in FIG. 4 in the manner described above.

The server 700 is arranged to handle cached content resources. The server 700 thus comprises the processor 700P and the memory 700M, said memory 700M comprising instructions executable by said processor 700P, whereby the server 700 is configured as follows.

The server 700 is configured to receive a download request from a client device 702 in a downloading session. This receiving operation may be performed by a receiving unit 700A in the server 700, e.g. in the manner described for action 200 above. The server 700 is also configured to identify at least one content resource deemed to be potentially needed later in the downloading session. This identifying operation may be performed by an identifying unit 700B in the server 700, e.g. in the manner described for action 202 above.

The server 700 is further configured to send a cache map to the client device 702 in a response to the received download request, the cache map comprising a pre-fetch indication indicating that the identified at least one content resource should be pre-fetched by the client device 702 from a cache containing the identified at least one content resource. This sending operation may be performed by a sending unit 700C in the server 700, e.g. in the manner described for action 206 above.

The client device 702 is arranged to handle cached content resources. The client device 702 thus comprises the processor 702P and the memory 702M, said memory comprising instructions executable by said processor whereby the client device 702 is operative as follows.

The client device 702 may be configured to send a download request to the server 700 in a downloading session. This sending operation may be performed by a sending unit 702A in the client device 702, e.g. in the manner described for action 400 above. The client device 702 is configured to receive a cache map from the server 700 during a downloading session, the cache map comprising a pre-fetch indication indicating that at least one content resource should be pre-fetched from a cache. This receiving operation may be performed by a receiving unit 702B in the client device 702, e.g. in the manner described for action 402 above.

The client device 702 is also configured to pre-fetch the at least one content resource from the cache according to the pre-fetch indication, to enable subsequent usage of the at least one content resource in the client device 702 once the at least one content resource is requested or needed in the client device. The pre-fetching operation may be performed by a pre-fetching unit 702C in the client device 702, e.g. in the manner described for action 404 above.

Figure 7:
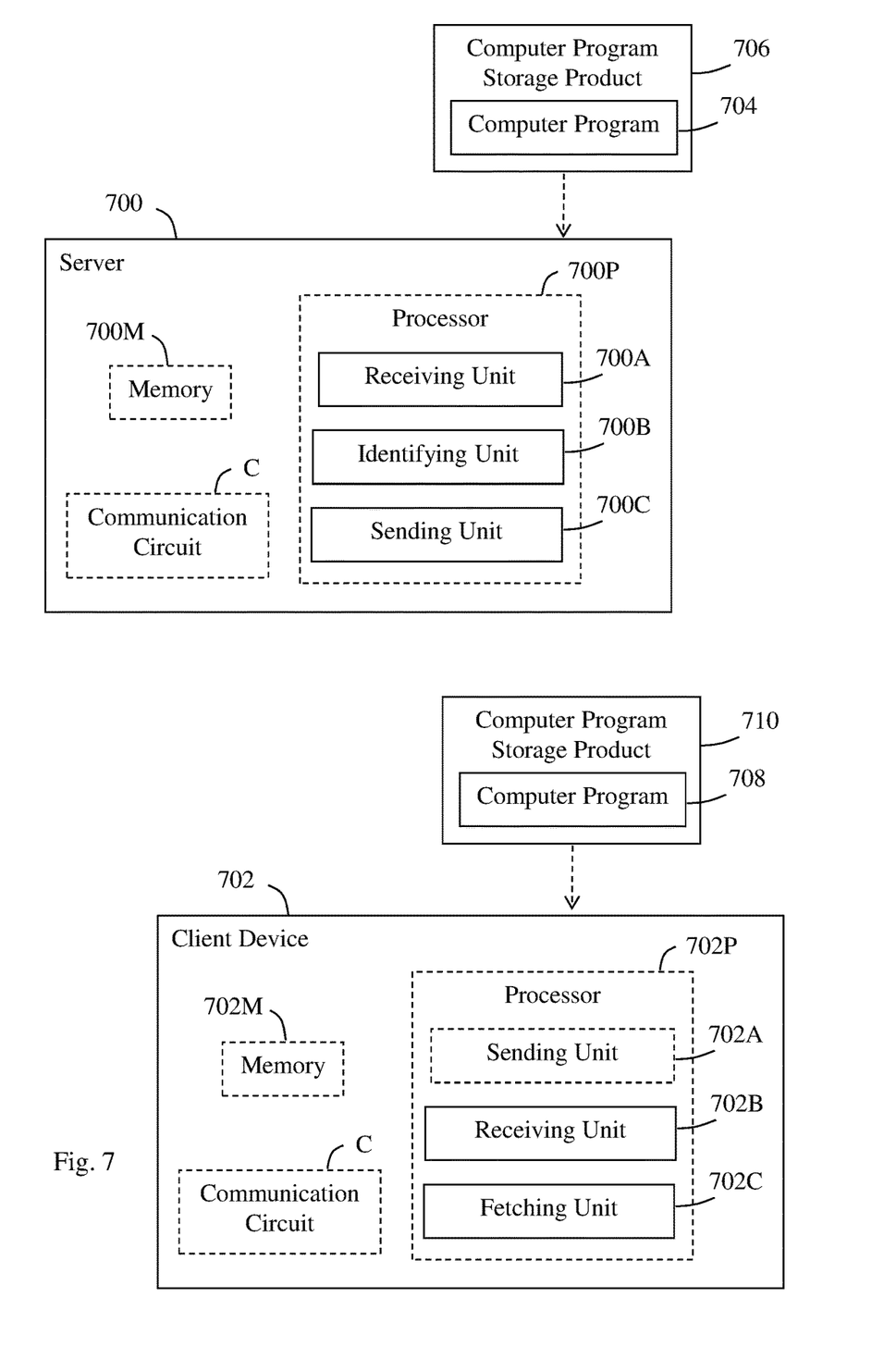
FIG. 7 is a block diagram illustrating a server and a client device in more detail, according to further possible embodiments.

It should be noted that FIG. 7 illustrates various functional units in the server 700 and the client device 702, respectively, and the skilled person is able to implement these functional units in practice using suitable software and hardware. Thus, the solution is generally not limited to the shown structures of the server 700 and the client device 702, and the functional modules 700A-C and 702A-C therein may be configured to operate according to any of the features and embodiments described in this disclosure, where appropriate.

The functional modules 700A-C and 702A-C described above may be implemented in the respective server 700 and client device 702 by means of program modules of a respective computer program 704 and 708 comprising code means which, when run by the processor 700P, 702P causes the respective server 700 and the client device 702 to perform the above-described actions and procedures. Each processor 700P, 702P may comprise a single Central Processing Unit (CPU), or could comprise two or more processing units. For example, each processor 700P, 702P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program 704, 708 may be carried by a computer program storage product 706 and 710, respectively, in each of the server 700 and the client device 702 in the form of a memory having a computer readable medium and being connectable to the respective processor 700P, 702P. The computer program storage product 706, 710 in each of the server 700 and the client device 702 may thus comprise a computer readable medium on which the respective computer program 704, 708 is stored e.g. in the form of computer program modules or the like. For example, the memory 700M, 702M in each node may be a flash memory, a Random-Access Memory (RAM), a Read-Only Memory (ROM) or an Electrically Erasable Programmable ROM (EEPROM), and the program modules could in alternative embodiments be distributed on different computer program storage products in the form of memories within the respective server 700 and client device 702.

The solution described herein may thus be implemented in each of the server 700 and the client device 702 by a computer program 704, 708 comprising instructions which, when executed on the server 700 and the client device 702, cause the server 700 and the client device 702 to carry out the actions according to the above respective embodiments, where appropriate. The solution may also be implemented at each of the server 700 and the client device 702 in a computer program storage product 706, 710 comprising instructions which, when executed on the server 700 and the client device 702, cause the server 700 and the client device 702 to carry out the actions according to the above respective embodiments, where appropriate.

While the solution has been described with reference to specific exemplifying embodiments, the description is generally only intended to illustrate the inventive concept and should not be taken as limiting the scope of the solution. For example, the terms "server", "client device", "content resource", "cache", "cache map", "pre-fetch indicator" and "metadata" have been used throughout this disclosure, although any other corresponding entities, functions, and/or parameters could also be used having the features and characteristics described here. The solution is defined by the appended claims.

The invention claimed is:

1. A method performed by a server for handling cached content resources, the method comprising:
receiving a download request from a client device in a downloading session,
identifying at least one content resource deemed to be potentially needed later in the downloading session, and
sending a cache map to the client device in a response to the received download request, the cache map comprising a pre-fetch indication indicating that the identified at least one content resource should be pre-fetched by the client device from a cache containing the identified at least one content resource,
wherein an entry in the cache map for each of the identified at least one content resource comprises a pre-fetch indicator which is set to provide said pre-fetch indication and further comprises metadata indicating at least one of time and position of the client device for pre-fetching the respective content resource.

2. The method of claim 1, wherein the at least one content resource is identified based on any of:
events in one or more previous downloading sessions with the client device,
information in a HyperText Transfer Protocol (HTTP) header of a previous download request received from the client device, and
information about a current user of the client device.

3. The method of claim 2, wherein the information about the current user is obtained in a report message received from the client device or from a user information node to which the client device has reported previous download activities of the client device.

4. The method of claim 1, wherein the pre-fetch indication is included in the cache map upon detecting that a communication network used for the downloading session will be congested.

5. A method performed by a server for handling cached content resources, the method comprising:
receiving a download request from a client device in a downloading session,
identifying at least one content resource deemed to be potentially needed later in the downloading session, and
sending a cache map to the client device in a response to the received download request, the cache map comprising a pre-fetch indication indicating that the identified at least one content resource should be pre-fetched by the client device from a cache containing the identified at least one content resource, wherein the pre-fetch indication is included in the cache map upon detecting that a wireless connection used by the client device will get degraded.

6. The method of claim 5, wherein said detecting comprises at least one of:
detecting that the client device is moving into an area of deficient radio coverage, and
detecting that said wireless connection will be lost or interfered due to intense radio traffic.

7. The method of claim 5, wherein the pre-fetch indication is included in the cache map when further detecting that a signal quality of said wireless connection will be above a predefined level before getting degraded.

8. A server arranged to handle cached content resources, the server comprising a processor and a memory containing instructions executable by the processor, whereby the server is configured to:
receive a download request from a client device in a downloading session,
identify at least one content resource deemed to be potentially needed later in the downloading session, and
send a cache map to the client device in a response to the received download request, the cache map comprising a pre-fetch indication indicating that the identified at least one content resource should be pre-fetched by the client device from a cache containing the identified at least one content resource,
wherein an entry in the cache map for each of the identified at least one content resource comprises a pre-fetch indicator which is set to provide said pre-fetch indication and further comprises metadata indicating at least one of time and position of the client device for pre-fetching the respective content resource.

9. The server of claim 8, wherein the server is configured to identify the at least one content resource based on any of:
events in one or more previous downloading sessions with the client device,
information in a HyperText Transfer Protocol (HTTP) header of a previous download request received from the client device, and
information about a current user of the client device.

10. The server of claim 9, wherein the information about the current user is obtained in a report message received from the client device or from a user information node to which the client device has reported previous download activities of the client device.

11. The server of claim 8, wherein the server is configured to include the pre-fetch indication in the cache map upon detecting that a communication network used for the downloading session will be congested.

12. A server arranged to handle cached content resources, the server comprising a processor and a memory containing instructions executable by the processor, whereby the server is configured to:
receive a download request from a client device in a downloading session,
identify at least one content resource deemed to be potentially needed later in the downloading session, and
send a cache map to the client device in a response to the received download request, the cache map comprising a pre-fetch indication indicating that the identified at least one content resource should be pre-fetched by the client device from a cache containing the identified at least one content resource, wherein the server is configured to include the pre-fetch indication in the cache map upon detecting that a wireless connection used by the client device will get degraded.

13. The server of claim 12, wherein the server is configured to perform said detecting by at least one of:
detecting that the client device is moving into an area of deficient radio coverage, and
detecting that said wireless connection will be lost or interfered due to intense radio traffic.

14. The server of claim 12, wherein the server is configured to include the pre-fetch indication in the cache map when further detecting that a signal quality of said wireless connection will be above a predefined level before getting degraded.

15. A method performed by a client device for handling cached content resources, the method comprising:
- receiving a cache map from a server during a downloading session, the cache map comprising a pre-fetch indication indicating that at least one content resource should be pre-fetched from a cache, and
- pre-fetching the at least one content resource from the cache according to the pre-fetch indication, to enable subsequent usage of the at least one content resource in the client device once the at least one content resource is requested or needed in the client device, wherein an entry in the received cache map for each of the at least one content resource comprises a pre-fetch indicator which is set to provide said indication and wherein the at least one content resource is pre-fetched from said cache according to metadata comprised in said entry, the metadata indicating at least one of time and position of the client device for pre-fetching the respective content resource.

16. The method of claim 15, wherein said pre-fetching of the at least one content resource from the cache is executed by means of a caching agent implemented in any one of:
- a client application running in the client device,
- a script of a ServiceWorker, and
- a HyperText Transfer Protocol (HTTP) Library.

17. The method of claim 15, wherein the cache map is received in response to a download request sent to the server in the downloading session.

18. A client device arranged to handle cached content resources, the client device comprising a processor and a memory containing instructions executable by the processor, whereby the client device is configured to:
- receive a cache map from a server during a downloading session, the cache map comprising a pre-fetch indication indicating that at least one content resource should be pre-fetched from a cache, and
- pre-fetch the at least one content resource from the cache according to the pre-fetch indication, to enable subsequent usage of the at least one content resource in the client device once the at least one content resource is requested or needed in the client device, wherein an entry in the received cache map for each of the at least one content resource comprises a pre-fetch indicator which is set to provide said indication and wherein the at least one content resource is pre-fetched from said cache according to metadata comprised in said entry, the metadata indicating at least one of time and position of the client device for pre-fetching the respective content resource.

19. The client device of claim 18, wherein said pre-fetching of the at least one content resource from the cache is executed by means of a caching agent implemented in any one of:
- a client application running in the client device,
- a script of a ServiceWorker, and
- a HyperText Transfer Protocol (HTTP) Library.

20. The client device of claim 18, wherein the cache map is received in response to a download request sent to the server in the downloading session.

21. A non-transitory computer-readable medium comprising, stored thereupon, a computer program comprising instructions that, when executed on a server, cause the server to:
- receive a download request from a client device in a downloading session,
- identify at least one content resource deemed to be potentially needed later in the downloading session, and
- send a cache map to the client device in a response to the received download request, the cache map comprising a pre-fetch indication indicating that the identified at least one content resource should be pre-fetched by the client device from a cache containing the identified at least one content resource, wherein an entry in the cache map for each of the identified at least one content resource comprises a pre-fetch indicator which is set to provide said pre-fetch indication and further comprises metadata indicating at least one of time and position of the client device for pre-fetching the respective content resource.

22. A non-transitory computer-readable medium comprising, stored thereupon, a computer program comprising instructions that, when executed on a client device, cause the client device to:
- receive a cache map from a server during a downloading session, the cache map comprising a pre-fetch indication indicating that at least one content resource should be pre-fetched from a cache, and
- pre-fetch the at least one content resource from the cache according to the pre-fetch indication, to enable subsequent usage of the at least one content resource in the client device once the at least one content resource is requested or needed in the client device, wherein an entry in the received cache map for each of the at least one content resource comprises a pre-fetch indicator which is set to provide said indication and wherein the at least one content resource is pre-fetched from said cache according to metadata comprised in said entry, the metadata indicating at least one of time and position of the client device for pre-fetching the respective content resource.

* * * * *